United States Patent

Oyamada et al.

(10) Patent No.: US 9,255,606 B2
(45) Date of Patent: Feb. 9, 2016

(54) SLIDE BEARING DEVICE AND COMPRESSOR

(75) Inventors: Tomonaga Oyamada, Hitachinaka (JP); Masahiko Ono, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 573 days.

(21) Appl. No.: 13/388,585

(22) PCT Filed: Dec. 10, 2009

(86) PCT No.: PCT/JP2009/006764
§ 371 (c)(1),
(2), (4) Date: Feb. 2, 2012

(87) PCT Pub. No.: WO2011/070621
PCT Pub. Date: Jun. 16, 2011

(65) Prior Publication Data
US 2012/0288368 A1  Nov. 15, 2012

(51) Int. Cl.
*F04D 29/04* (2006.01)
*F16C 33/20* (2006.01)
(Continued)

(52) U.S. Cl.
CPC .............. *F16C 33/201* (2013.01); *F16C 33/107* (2013.01); *F04D 29/046* (2013.01)

(58) Field of Classification Search
CPC ..... F16C 33/107; F16C 33/201; F04D 29/046
USPC .............. 415/110, 112, 203, 206, 209, 216.1, 415/229; 384/123, 286, 291, 311, 316, 392, 384/397–400
See application file for complete search history.

(56) References Cited

U.S. PATENT DOCUMENTS

| 3,150,822 A | * | 9/1964 | Dreyfus et al. | ............... 415/111 |
| 3,942,847 A | * | 3/1976 | Parr | ............................... 384/115 |
| 7,757,403 B1 | * | 7/2010 | Lee et al. | ................... 29/898.15 |

(Continued)

FOREIGN PATENT DOCUMENTS

| CN | 2209238 Y | 10/1995 |
| CN | 1776234 A | 5/2006 |

(Continued)

OTHER PUBLICATIONS

Engineering Toolbox, Surface Roughness and Mechanical Processes, http://www.engineeringtoolbox.com/surface-roughness-d_1368.html, Oct. 2014.*

(Continued)

*Primary Examiner* — Igor Kershteyn
*Assistant Examiner* — Woody A Lee
(74) *Attorney, Agent, or Firm* — Mattingly & Malur, PC (57) ABSTRACT

A slide bearing device and a compressor are capable of stably achieving a low friction condition from the early stage of the start of friction. The slide bearing device includes a bearing, a shaft supported by the bearing while being subjected to sliding, and a gas supply section for supplying a dry gas to a bearing slide section where the bearing and the shaft slide against each other. A slide surface of the bearing is formed of a resin composite material, which is a mixture of a carbon material and a resin. The shaft is made of a metal and includes a groove formed on a slide surface of the shaft, the groove extending in a direction different from the sliding direction. Plural grooves may be provided and the grooves may extend in arbitrary directions. The shaft may include a collection of plural recesses on the slide surface thereof.

16 Claims, 7 Drawing Sheets

(51) Int. Cl.
*F16C 33/10* (2006.01)
*F04D 29/046* (2006.01)

(56) References Cited

U.S. PATENT DOCUMENTS

| | | | |
|---|---|---|---|
| 8,172,503 B2* | 5/2012 | Sandstede et al. | 415/110 |
| 2002/0131656 A1* | 9/2002 | Knepper et al. | 384/110 |
| 2005/0025405 A1 | 2/2005 | Tamaoka | |
| 2010/0080701 A1* | 4/2010 | Ono | 415/229 |

FOREIGN PATENT DOCUMENTS

| | | | |
|---|---|---|---|
| CN | 1816702 A | | 8/2006 |
| JP | 11-279413 A1 | | 10/1999 |
| JP | 2006-038211 A | | 2/2006 |
| JP | 2007-100722 A1 | | 4/2007 |
| JP | 2008-082356 A1 | | 4/2008 |
| JP | 2008082356 | * | 10/2008 ............. F16C 32/06 |
| JP | 2009-133418 A | | 6/2009 |
| WO | 2004/105457 A2 | | 12/2004 |

OTHER PUBLICATIONS

N.L. McCook et al, "Tribiological results of PEEK nanocomposites in dry sliding against 440C in various gas environments", Elsevier, WEAR, 262, 2007, pp. 1511-1515.

T. Oyamada et al, "Friction and wear of PEEK reinforced with carbon fibers in nitrogen at normal and cryogenic temperature", Conference Proceedings of STLE Annual Meeting, Society of Tribiologists and Lubrication Engineers, 2009.

G. Theiler et al, "Friction and wear of carbon fibre filled polymer composites at room and low temperatures", Mat.-wiss. u. Werkstofftech., 2004, 35, No. 10/11, pp. 683-689.

T. Oyamada et al, "Investigating low friction behavior of PEEK reinforced with carbon fibers in nitrogen at normal and crygenic temperatures", World Tribiology Congress 2009, Kyoto, Japan, Sep. 6-9, 2009, J-212, p. 391.

Japanese Office Action received in Japanese Application No. 2011-544983 dated Mar. 12, 2013.

* cited by examiner

SLIDE BEARING DEVICE AND COMPRESSOR

TECHNICAL FIELD

The present invention relates to a slide bearing device capable of sliding with a small coefficient of friction without using lubricating oil, specifically relates to a bearing device whose slide section is formed of a resin and a metal. Also the present invention relates to a compressor utilizing the slide bearing device.

BACKGROUND ART

Resin material, which is excellent in self-lubricity in general, is commonly and practically used as a slide material for a slide bearing device used in an environment where a lubricant such as lubricating oil and grease cannot be used. However, when the resin material is solely used as a slide material, the load resistance and abrasive resistance may not be sufficient. It is known that friction and abrasion can be reduced compared with a case of solely using a resin when fabric materials represented by glass fiber and carbon fiber and a solid lubricant represented by graphite, polytetrafluoroethylene (PTFE), and molybdenum disulfide are mixed with a resin to make a resin composite material.

In recent years, a slide bearing device with less friction and more excellent abrasion-resistance than before has been required. Most of these resin composite materials have problems that the coefficient of friction became 0.1 or above when they are slid in the atmosphere without supplying lubricating oil and that friction is greater when compared with the case of using lubricating oil and grease.

To solve these problems, as a method for achieving low friction, below 0.1 of coefficient of friction, even when lubricating oil is not supplied, there is a method of constructing a slide part using a slide material suitable to an atmospheric gas or combining a specific atmospheric gas and a slide material. For example, a slide member for high pressure dry gas described in the patent document 1 is proposed, and the non-patent document 1 and non-patent document 2 show a slide part configuration allowing a resin composite material to be rubbed in a dry gas atmosphere and its friction characteristics.

The slide member described in the patent document 1 is formed by mixing carbon fibers and graphite powder into a thermosetting resin and by performing hot-pressing, and it is described that low friction and less abrasion are exhibited particularly in a high pressure dry gas atmosphere.

The non-patent document 1 and non-patent document 2 are reports of experiments in which a resin composite material and stainless steel were made to rub against each other in various gas atmospheres, such as air or dry nitrogen, and it is reported that friction was lowered to approximately 0.05 of the coefficient of friction when a polyetheretherketone (PEEK) resin composite material mixed with carbon-based particles, such as carbon powder, carbon nanotubes, and carbon fibers was rubbed in a dry gas atmosphere.

However, when these methods are to be actually implemented, it is common that the effect of reduction in the coefficient of friction changes according to the processing quality of a sliding component and a sliding condition such as a load, and that the condition stably securing the coefficient of friction of 0.1 or below is limited. Also, the coefficient of friction is as high as 0.2 to 0.3, for example, at the early stage of friction, and, even if fitting advances and the coefficient of friction lowers eventually, it may possibly take quite a long time to reach such a state depending on the condition. Therefore, in application to general machine products such as a compressor and a slide bearing device, it is desirable to devise a method to secure the effect of reduction in the coefficient of friction more stably and earlier.

DOCUMENTS ON PRIOR ARTS

Patent Document

Patent document 1: Japanese Unexamined Patent Application Publication No. H11-279413

Non-Patent Documents

Non-patent document 1: N. L. McCook, M. A. Hamilton, D. L. Burris, W. G. Sawyer, Tribological results of PEEK nanocomposites in dry sliding against 440 C in various gas environments, Elsevier, WEAR, 262 (2007), pp. 1511-1515.

Non-patent document 2: T. Oyamada, M. Ono, Y. Murai, H. Miura and T. Kuwano, Friction and wear of PEEK reinforced with carbon fibers in nitrogen at normal and cryogenic temperature, Conference Proceedings of STLE Annual Meeting, Society of Tribologist & Lubrication Engineers, 2009.

DISCLOSURE OF THE INVENTION

Problems to be Solved by the Invention

In a slide bearing device and a compressor using a slide bearing device, the conventional configuration described above of the slide section has problems: the effect of reduction in the coefficient of friction changes according to the processing quality of a sliding component and a sliding condition such as a load, it takes quite a long time until the effect of reduction in the coefficient of friction is secured, and stable low friction state is hardly secured.

The present invention is to solve the problems described above, and its technical object is to stably achieve a low friction state from early stage of the start of friction in a slide bearing device and a compressor.

Means for Solving the Problem

In order to solve the problems described above, the slide bearing device according to the present invention has the characteristics described below.

One aspect of a slide bearing device includes a bearing, a shaft supported by the bearing while being subjected to sliding, and a gas supply section for supplying a dry gas to a bearing slide section where the bearing and the shaft slide against each other. The bearing includes at least a slide surface formed of a resin composite material, the resin composite material being a mixture of a carbon material and a resin. The shaft is made of a metal and includes a groove formed on a slide surface of the shaft, the groove extending in a direction different from a sliding direction.

Another aspect of a slide bearing device includes a bearing, a shaft supported by the bearing while being subjected to sliding, and a gas supply section for supplying a dry gas to a bearing slide section where the bearing and the shaft slide against each other. The bearing includes at least a slide surface formed of a resin composite material, the resin composite material being a mixture of a carbon material and a resin. The shaft is made of a metal and includes a collection of a plurality of grooves formed on a slide surface of the shaft, the plurality of grooves extending in a direction different from a sliding direction.

Preferably, the plurality of grooves extend in arbitrary directions in the above slide bearing device.

Another aspect of a slide bearing device includes a bearing, a shaft supported by the bearing while being subjected to sliding, and a gas supply section for supplying a dry gas to a bearing slide section where the bearing and the shaft slide against each other. The bearing includes at least a slide surface formed of a resin composite material, the resin composite material being a mixture of a carbon material and a resin. The shaft is made of a metal and includes a collection of a plurality of recesses formed on a slide surface of the shaft.

It is preferable that the slide surface of the shaft has a roughness of 0.2 μm or more in arithmetic average roughness.

A compressor according to the present invention has the characteristics described below.

One aspect of a compressor includes a slide bearing, a driving shaft being supported by the slide bearing and rotating, a compressing section being connected to the driving shaft and compressing fluid, and a gas supply section for supplying a dry gas to a bearing slide section where the slide bearing and the driving shaft slide against each other. The slide bearing is formed of a resin composite material, the resin composite material being a mixture of a carbon material and a resin. The driving shaft includes a groove formed on a slide surface of the driving shaft, the groove extending in a direction different from a sliding direction.

Another aspect of a compressor includes a slide bearing, a driving shaft being supported by the slide bearing and rotating, a compressing section being connected to the driving shaft and compressing fluid, and a gas supply section for supplying a dry gas to a bearing slide section where the slide bearing and the driving shaft slide against each other. The slide bearing is formed of a resin composite material, the resin composite material being a mixture of a carbon material and a resin. The driving shaft includes a collection of a plurality of grooves formed on a slide surface of the driving shaft, the plurality of grooves extending in a direction different from a sliding direction.

Preferably, the plurality of grooves extend in arbitrary directions in the above compressor.

Another aspect of a compressor includes a slide bearing, a driving shaft being supported by the slide bearing and rotating, a compressing section being connected to the driving shaft and compressing fluid, and a gas supply section for supplying a dry gas to a bearing slide section where the slide bearing and the driving shaft slide against each other. The slide bearing is formed of a resin composite material, the resin composite material being a mixture of a carbon material and a resin. The driving shaft includes a collection of a plurality of recesses formed on a slide surface of the driving shaft.

It is preferable that the slide surface of the driving shaft has a roughness of 0.2 μm or more in arithmetic average roughness.

Advantageous Effects of the Invention

According to the present invention, a slide bearing device can be provided which promotes abrasion in fitting between the bearing and the shaft in the early stage of sliding and reduces the coefficient of friction early after start of use. Also, the progress of abrasion is suppressed with advancement of fitting and the variation of the effect of reduction in the coefficient of friction due to the slide condition such as a load is suppressed, stably reducing the driving energy for a variety of machine apparatuses, such as a compressor. In addition, because lubricating oil and grease are not used, consumption of resources can be suppressed and environmental load can be reduced.

BRIEF DESCRIPTION OF THE DRAWINGS

FIG. 6 is a graph showing a result of measurement of the coefficients of friction of the cylindrical shaft with the grooves and of the cylindrical shaft without a groove in the second embodiment of the present invention;

BEST MODE FOR CARRYING OUT THE INVENTION

The present inventors have made intensive studies so that a low friction state with a coefficient of friction of 0.1 or below could be stably achieved from the early stage of the start of friction in a slide bearing device including a bearing formed of resin composite material and a shaft made of metal. As a result, it was found out that a stable and low friction state was achieved when a surface layer was formed in which fine abrasion powder of the bearing formed of resin composite material was scattered on the surface of the slide section slid against the shaft, a transfer surface layer of a resin slide material was formed on the surface of the shaft made of metal, and a state in which the both surface layers were stably maintained was achieved while sliding with the dry gas supplied. Also, the present inventors had an idea that the both surface layers were formed by abrasion powder generated by fitting abrasion of the resin composite material in the early stage of sliding, and decided to positively utilize the fitting abrasion. Accordingly, through execution of a number of experiments and studies based on such considerations, the present inventors came to know that the coefficient of friction could be reduced early and effectively by properly promoting fitting abrasion through supply of a dry gas to the slide section and optimization of the contact condition, and by forming a surface shape not imparting excessive damage on the shaft made of metal. The present invention was thus completed.

That is, the slide bearing device according to the present invention includes a bearing made of a resin composite material obtained by mixing a carbon material into a resin, a shaft made of a metal supported by the bearing while being subjected to sliding, and a dry gas supply section for supplying a dry gas to a section where the bearing and the shaft slide against each other (hereinafter referred to as a "bearing slide section"). The shaft includes a groove extending in a direction different from the sliding direction, a collection of a plurality of grooves extending in a direction different from the sliding direction, a collection of a plurality of grooves extending in arbitrary directions different from the sliding direction, or a collection of a plurality of recesses, formed in a surface range (slide surface) to be rubbed against the bearing. In the bearing, at least the surface to be rubbed against the shaft (slide surface) is formed of a resin composite material.

In the slide bearing device according to the present invention, sliding between the bearing and the shaft may be any sliding of rotation, swinging, or reciprocating motion. The form of the bearing section may be, for example, a cylindrical end face type, cylindrical flat plane type, pin-disk type, journal type, reciprocating type, a partial bearing thereof, or a complex bearing combined thereof.

The resin material of the bearing section is a resin composite material obtained by mixing a resin with a carbon material in a fibriforms, spherical, flaky, particulate, or granular form. For the carbon material, one kind or plural kinds may be used out of the forms described above. With respect to the resin, at least one kind or more is used from thermoplastic resins. Examples of such thermoplastic resins include polyamide, polyphtalamide, polyamideimide, polyacetal, polyphenylenesulfide, polyetherimide, ultra-high molecular weight polyethylene, polyetheretherketone.

The dry gas supplied to the bearing slide section may be a gas including oxygen. Examples of such dry gas include dry air with moisture of −50° C. or below in terms of the dew point temperature.

Also, the dry gas supplied to the bearing slide section may be a gas not including oxygen. Examples of such dry gas include an inert gas such as nitrogen and argon, hydrogen gas, and hydrocarbon gas.

The groove formed on the surface of the slide section of the shaft (slide surface) may be straight perpendicular to the sliding direction, lattice-shaped with grooves in two directions or more being crossed with each other, free-curve shaped, and wavy-line shaped. The groove should include a portion extending in a direction different from the sliding direction in the surface region to be rubbed against the bearing. The effect of the grooves described above can be secured when the slide section of the shaft has a collection of a number of short grooves not oriented in the sliding direction are formed on the surface thereof or a collection of a number of recesses are formed by processing means such as shot blasting on the surface thereof. The surface roughness of the slide section of the shaft is to be 0.2 μm or more in terms of the arithmetic average roughness (Ra), preferably 0.8 μm or more.

Embodiments of a slide bearing device and a compressor according to the present invention will be described below referring to drawings. The present invention is not limited to these embodiments.

First Embodiment

Figure 1:
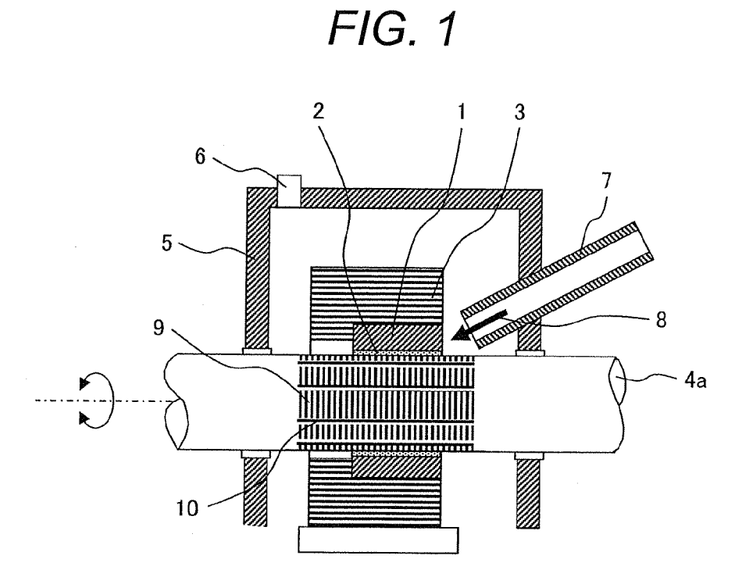
FIG. 1 shows a slide bearing device according to a first embodiment of the present invention.

With reference to FIG. 1, a fundamental configuration of a slide bearing device according to the present invention will be described. FIG. 1 shows a journal type of slide bearing device in accordance with a first embodiment of the present invention.

In the slide bearing device, a bearing 1, which includes a resin slide section 2, is press-fitted into a casing 3 and rotatably supports a shaft 4a. The casing 3 is configured to apply a load on the bearing 1. A motor (not shown in FIG. 1) for rotational driving is connected to one end of the shaft 4a. The bearing slide section is a portion where the resin slide section 2 of the bearing 1 and the shaft 4a slide against each other, and is also simply referred to as a "slide section."

The material of the resin slide section 2 of the bearing 1 is a resin composite material obtained by mixing 30 wt % carbon fibers into polyetheretherketone (PEEK) which is a thermoplastic resin. The shaft 4a is made of stainless steel.

The bearing 1 is covered with a protection cover 5, and a venting hole 6 is provided in the upper part of the protection cover 5.

In the slide bearing device, a gas supply section 7 is provided to penetrate the protection cover 5. The gas supply section 7 introduces dry gas to the interior of the protection cover 5 as shown by a flow 8 of the gas. The dry gas, as shown by the flow 8 of the gas, moves from the gas supply section 7 toward the bearing slide section where the bearing 1 and the shaft 4a relatively move while being rubbed against each other.

The shaft 4a has a cylindrical shape, and has processing traces 9 formed on it in the circumferential direction because the surface was processed and shaped while being rotated in the circumferential direction using a lathe. Because the shaft 4a rotates and slides in the circumferential direction, the processing traces 9 are oriented in the direction nearly same as the sliding direction of the shaft 4a. When the roughness of the slide surface of the shaft 4a was measured at this time point, it was 0.8 μm in terms of the arithmetic average roughness (Ra). The shaft 4a has grooves 10 formed by machining with a width of 0.15 mm and a depth of 0.03 mm extending in the direction perpendicular to the sliding direction in the surface range to be rubbed against the bearing 1. That is, the grooves 10 are nearly perpendicular to the processing traces 9.

As the dry gas, nitrogen was continuously supplied to the interior of the protection cover 5 through the gas supply section 7 at a flow rate of 20 L/min, and then the relative humidity in the vicinity of the bearing 1 was controlled to below 2%. The dry gas is supplied to the slide section and its vicinity through the end part of the slide section of the bearing 1 and the shaft 4a, the gap between the bearing 1 and the shaft 4a (slide section gap), and the grooves 10, and spreads to entire slide section of the bearing 1 and the shaft 4a.

In this state, a load was applied by the casing 3 so that the average pressure of contact faces of the bearing 1 and the shaft 4a became 8 MPa, and the coefficient of friction during motion was measured. The coefficient of friction was approximately 0.25 in the early stage of sliding, reducing to 0.07 after 1,000 times of sliding. When the load was increased so that the average pressure of contact faces became 25 MPa and the measurement was conducted again, the coefficient of friction similarly reduced and became 0.06 after 1,000 times of sliding.

Figure 2:
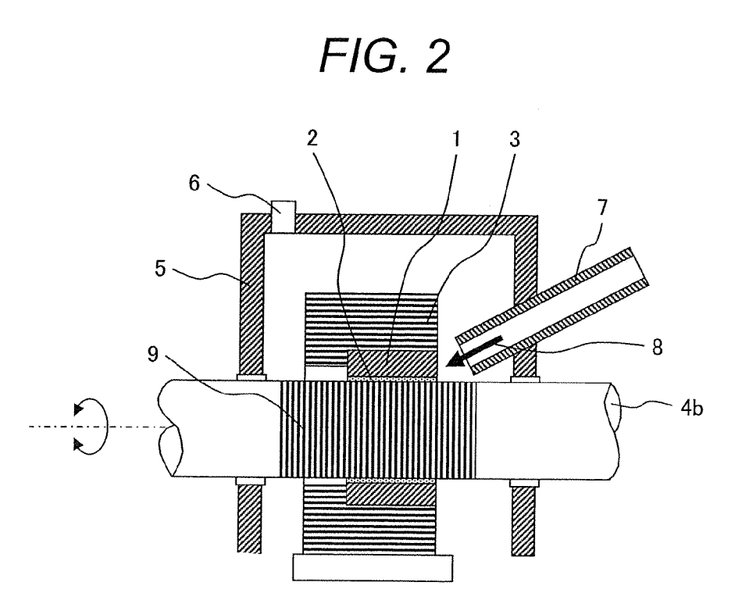
FIG. 2 shows a slide bearing device including a shaft without a groove.

For a comparison, measurement was conducted under the same condition using a slide bearing device whose shaft did not include a groove. FIG. 2 shows a slide bearing device including a shaft 4b without a groove. In FIG. 2, the same reference numerals with those of FIG. 1 represent elements same or common with those in FIG. 1. The slide bearing device shown in FIG. 2 has a structure and shape same as the slide bearing device shown in FIG. 1 has, except that the grooves 10 are not formed on the shaft 4b.

As a result of measuring the coefficient of friction with the average pressure of contact faces of 8 MPa using the slide bearing device shown in FIG. 2, the coefficient of friction was 0.2 or above when sliding began with the coefficient of friction of approximately 0.25 in the early stage of the sliding and the sliding was repeated 1,000 times. When the load was increased so that the average pressure of contact faces became 25 MPa and the measurement was conducted again, the coefficient of friction reduced to 0.07 after 1,000 times of sliding.

Thus, in the slide bearing device including the shaft 4b without a groove (FIG. 2), the coefficient of friction variously changed according to the slide condition, and friction could not be reduced effectively in some cases. On the other hand, in the slide bearing device including the shaft 4a with the grooves 10 formed (FIG. 1), the coefficient of friction could be reduced equally even when the load condition was changed.

It is only necessary for the groove 10 to pass over the slide face of the bearing 1 and the shaft 4a within the motion range of the slide bearing device, and the effect can be secured as far as one groove is present at minimum on the shaft 4a. However, in the case of the slide bearing device repeating fine motions or the slide bearing device causing plane contact, it is preferable to increase the number of the grooves 10 corresponding to the slide motion range and the contact range so that the grooves 10 can entirely and thoroughly pass over the slide surface during motion.

Second Embodiment

With reference to FIG. 3 to FIG. 11, a slide bearing device in the cylindrical flat plane type according to the present invention and the verification result on the effect of the present invention will be described.

Figure 3:
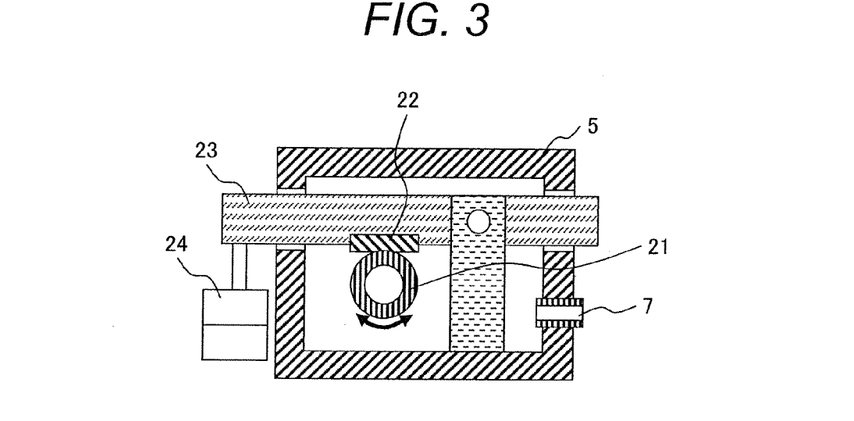
FIG. 3 shows a slide bearing device according to a second embodiment of the present invention.

FIG. 3 shows a slide bearing device in the cylindrical flat plane type according to the present invention. The slide bearing device shown in FIG. 3 is configured that a flat plane type bearing 22 contacts and slides against the outer peripheral surface of a cylindrical shaft 21 made of a metal. The flat plane type bearing 22 is attached to a cantilever 23, and is pressed to the outer peripheral surface of the cylindrical shaft 21 when a weight 24 is hung from the cantilever 23.

The cylindrical shaft 21 is made of stainless steel. The flat plane type bearing 22 is made of a polyetheretherketone (PEEK) resin composite material mixed with 30 wt % carbon fibers.

A motor (not shown in FIG. 3) for rotational driving is connected to one end of the cylindrical shaft 21, and the cylindrical shaft 21 is rotated by the motor along its circumferential direction and slides against the flat plane type bearing 22. The periphery of the slide section (bearing slide section) of the cylindrical shaft 21 and the flat plane type bearing 22 is covered with the protection cover 5. The dry gas is introduced to the interior of the protection cover 5 from the gas supply section 7 penetrating the protection cover 5, and is supplied to the bearing slide section where the flat plane type bearing 22 and the cylindrical shaft 21 contact with each other.

The coefficient of friction during motion from the early stage of sliding was measured in time series using the slide bearing device shown in FIG. 3. As the dry gas, nitrogen was continuously supplied at the flow rate of 20 L/min, and the relative humidity in the vicinity of the flat plane type bearing 22 was controlled to below 2%.

Figure 4:
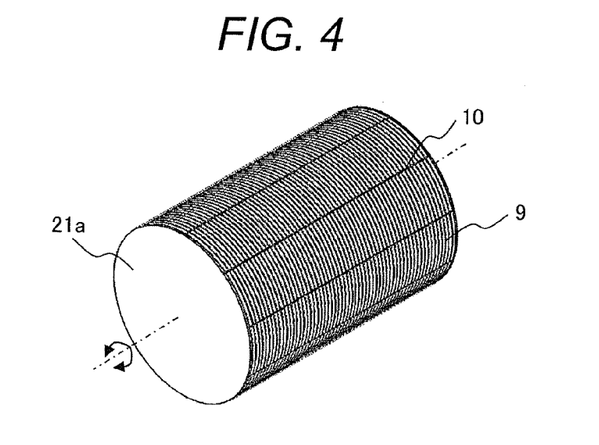
FIG. 4 shows a cylindrical shaft including grooves extending in the direction perpendicular to the slide direction, used for a slide bearing device according to the second embodiment of the present invention.
Figure 5:
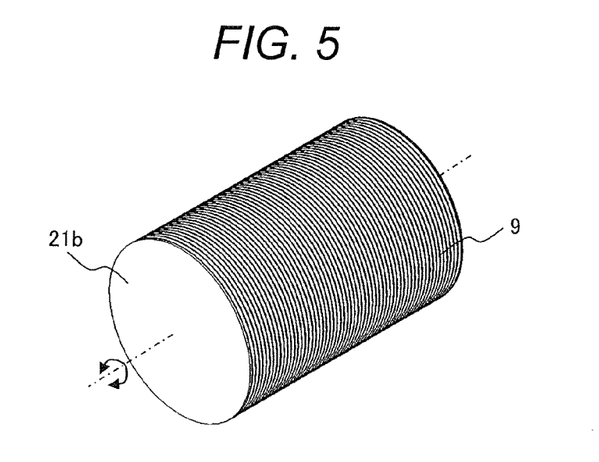
FIG. 5 shows a cylindrical shaft without a groove in a slide bearing device.

FIG. 4 and FIG. 5 show cylindrical shafts used in the second embodiment. The cylindrical shafts 21a and 21b have processing traces 9 formed on them in the circumferential direction because the surfaces were processed and shaped while being rotated in the circumferential direction using a lathe. When the surface roughness of the outer peripheral surfaces of the cylindrical shafts 21a and 21b was measured at this time point, it was 0.8 μm in terms of the arithmetic average roughness (Ra). The grooves 10 were formed only on the cylindrical shaft 21a shown in FIG. 4 on the peripheral surface. The grooves 10 with a width of 0.15 mm and a depth of 0.03 mm, extending in the direction perpendicular to the rotational direction of the cylindrical shaft 21a indicated by an arrow in FIG. 4, that is, extending in the direction perpendicular to the slide direction, were formed by machining in the surface range where the cylindrical shaft 21a slides against the flat plane type bearing 22.

The cylindrical shafts 21a and 21b shown in FIG. 4 and FIG. 5 were assembled respectively in the slide bearing device shown in FIG. 3, and the coefficient of friction was measured. FIG. 6 shows the result of the measurement. The coefficients of friction in the early stage of sliding were approximately 0.25, nearly equal, in both cases of using cylindrical shafts 21a and 21b.

When the cylindrical shaft 21a including the grooves 10 was used, the coefficient of friction reduced as sliding was repeated, and the coefficient of friction kept below 0.1 on or after 300 times of repetition of sliding. The coefficient of friction was 0.07 at 2,000 times of repetition of sliding. On the other hand, when the cylindrical shaft 21b without any process of the grooves 10 was used, the coefficient of friction once increased as sliding was repeated, thereafter decreased with the repetition of sliding, keeping 0.3 or above even when the sliding was repeated 2,000 times, however. Both measurements were performed under an equal condition of load setting, and the average pressure of contact calculated from the traces of contact after the measurement was 8 MPa.

Figure 7:
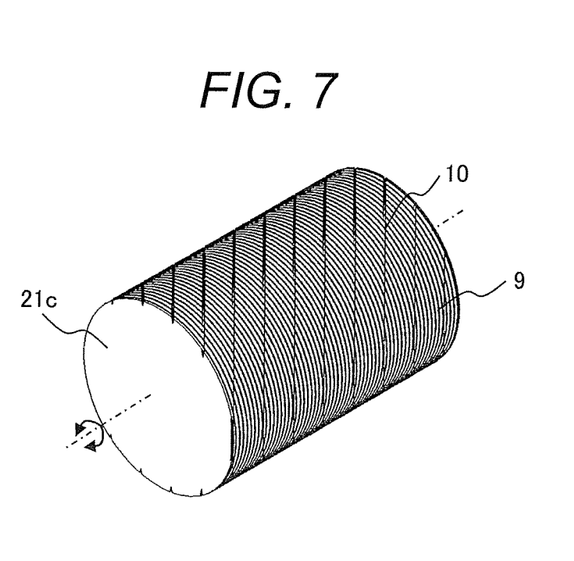
FIG. 7 shows a cylindrical shaft including grooves extending in a direction different from both of the sliding direction and the axial direction in the second embodiment of the present invention.

FIG. 7 shows another cylindrical shaft including the grooves. In the cylindrical shaft 21c shown in FIG. 7, the surface was processed and shaped while being rotated in the circumferential direction using a lathe, and thereafter the grooves 10 with a width of 0.15 mm and a depth of 0.03 mm extending in the direction different from both the slide direction (the rotational direction shown by an arrow in FIG. 7) and the axial direction of the cylindrical shaft 21c were formed by machining in the surface range where the cylindrical shaft 21c slides against the flat plane type bearing 22.

The cylindrical shaft 21c shown in FIG. 7 was assembled in the slide bearing device shown in FIG. 3, and the coefficient of friction was measured under the condition same as in the measurement described above. In this case also, the coefficient of friction reduced as sliding was repeated, and was 0.07 when sliding was repeated 2,000 times. Thus, by differentiating the extending direction of the grooves 10 from both the slide direction and the axial direction of the cylindrical shaft, the effect of the grooves 10 can be stably secured and the coefficient of friction can be reduced even in the case of a machine whose cylindrical shaft moves in the axial direction in addition to the rotational direction.

Figure 8:
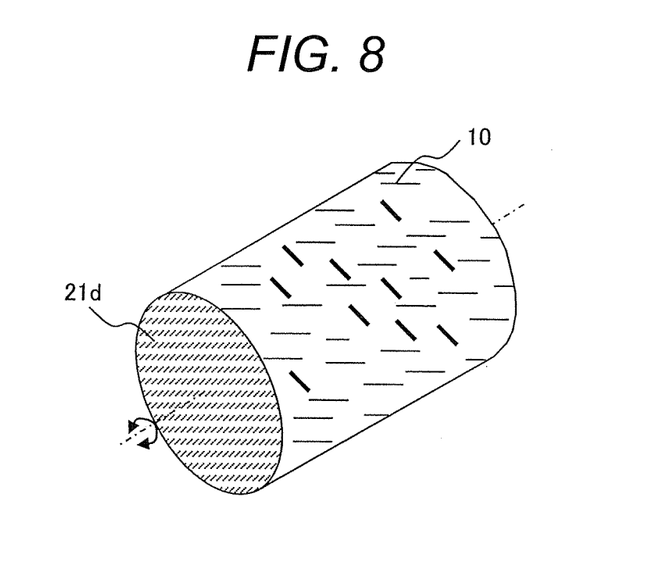
FIG. 8 shows a cylindrical shaft including a collection of grooves not having a fixed orientation in the second embodiment of the present invention.

FIG. 8 shows another cylindrical shaft including the grooves. The cylindrical shaft 21d shown in FIG. 8 has grooves 10 formed and scattered on the surface, the grooves 10 having a short length and a random distribution in orientation. The grooves 10 extend in arbitrary directions under a condition that they are not oriented in the sliding direction. The length and layout of the grooves 10 do not matter as far as the grooves 10 are configured to pass over the slide face of the flat plane type bearing 22 by sliding motion.

The cylindrical shaft 21d shown in FIG. 8 was assembled in the slide bearing device shown in FIG. 3, and was slid to measure the coefficient of friction. The coefficient of friction was approximately 0.25 in the early stage of sliding, reducing to 0.08 when sliding was repeated 2,000 times. Thus, the effect of the grooves can be stably secured by forming the grooves 10 as a collection of grooves without a fixed orientation even in the slide bearing device in which motions occur in all directions.

Through a number of experiments and analytical observations, the present inventors came to know that the important points in the effect of reduction in the coefficient of friction by formation of the grooves 10 were, as a first action, to impart a surface pressure distribution in the contact state of the shaft and the bearing and to promote fitting abrasion and formation of a surface layer caused by the fitting abrasion and, as a second action, to supply a dry gas to the slide section through the grooves 10 and not to excessively increase abrasion of the bearing made of resin composite material. Making the grooves 10 a collection of shorter and non-continuous grooves, which may reduce the second action, can exert the effect to reduce friction by the first action.

Figure 9:
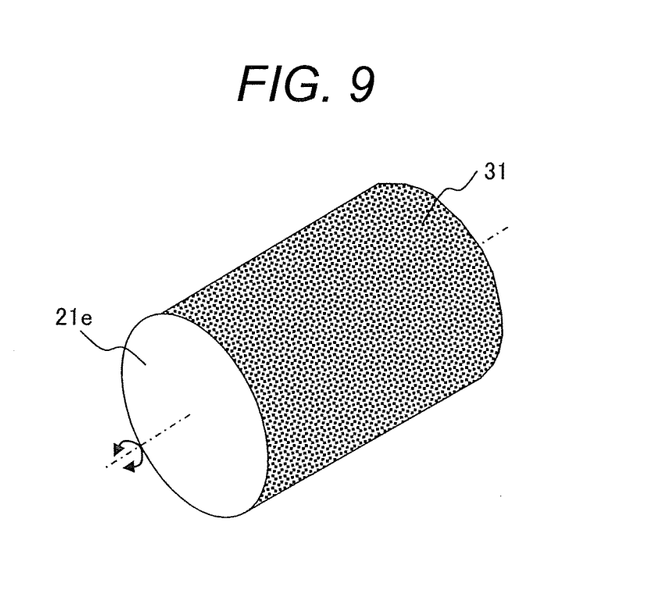
FIG. 9 shows a cylindrical shaft including a number of fine recesses formed and scattered on the surface by shot blasting in the second embodiment of the present invention.
Figure 10:
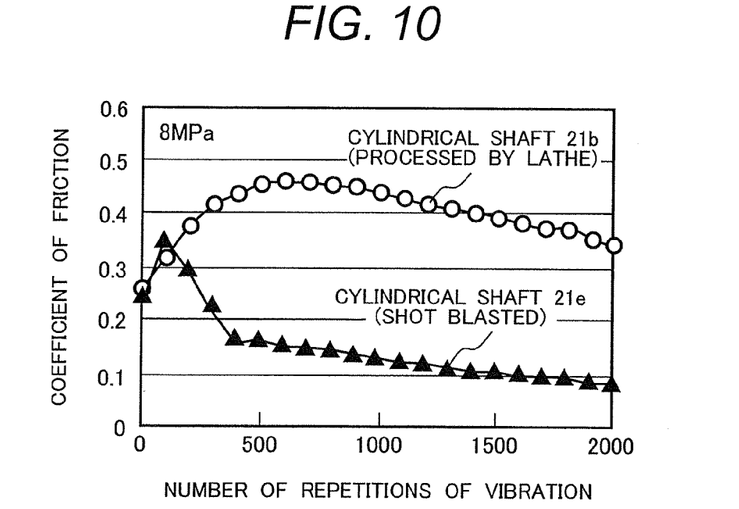
FIG. 10 is a graph showing a result of measurement of the coefficients of friction of the cylindrical shaft with the shot blasting and of the cylindrical shaft without the shot blasting in the second embodiment of the present invention.

FIG. 9 shows a cylindrical shaft 21e including a number of fine recesses 31 scattered on the surface. The recesses were formed by subjecting the outer peripheral surface of the cylindrical shaft 21e to shot blasting. When the surface roughness of the outer peripheral surface was measured, the arithmetic average roughness (Ra) was 0.8 μm The cylindrical shaft 21e was assembled in the slide bearing device shown in FIG. 3, and was slid to measure the coefficient of friction under the same condition as executed for the cylindrical shafts 21a and 21b. FIG. 10 shows the result of the measurement. In order to investigate the effect of shot blasting, FIG. 10 also shows the measurement result of the coefficient of friction of the cylindrical shaft 21b (FIG. 6). The coefficient of friction of the cylindrical shaft 21e was approximately 0.25 in the early stage of sliding and reduced as sliding was repeated, reducing to approximately 0.1 when sliding was repeated 2,000 times. Although the effect of reduction in the coefficient of friction due to repetition of sliding was secured, the reduction was moderate by the influence of the weakened second action described above, compared with the case that the cylindrical shaft 21a shown in FIG. 4 (the shaft with the grooves 10) was used. However, by thus forming a collection of fine recesses 31 with less orientation on the cylindrical shaft by shot blasting instead of the grooves 10, an advantageous effect can be obtained that the cylindrical shaft can be used commonly for the slide bearing devices executing motions in all directions.

The present inventors found out that, for example, in the cylindrical shaft 21e having a collection of fine recesses 31 formed on the surface by shot blasting shown in FIG. 9, the effect of reduction in the coefficient of friction was particularly different due to the surface roughness and due to the surface pressure applied on the slide surface.

With respect to a plurality of the cylindrical shafts 21, the outer peripheral surface was processed so that each surface roughness was different by shot blasting similarly to the case of the cylindrical shaft 21e shown in FIG. 9. Each of these cylindrical shafts 21 was assembled in the slide bearing device shown in FIG. 3, and was slid under the same condition as executed for the cylindrical shafts 21a and 21b. As a result, the coefficient of friction was approximately 0.25 in the early stage of sliding for all cases of using any cylindrical shafts 21. However, the degree of reduction in the coefficient of friction was different as sliding was repeated depending on each of the cylindrical shafts 21.

Figure 11:
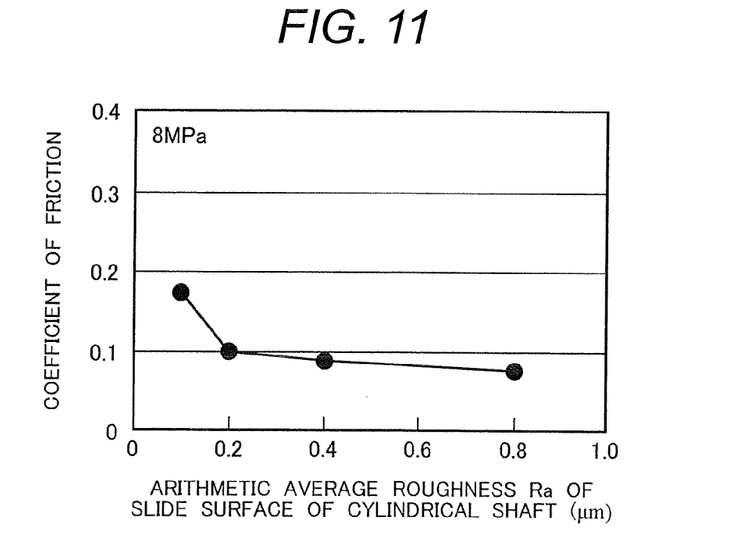
FIG. 11 is a graph showing a relation between the roughness of the slide surface of the cylindrical shaft caused by shot blasting and the coefficient of friction in the second embodiment of the present invention.

FIG. 11 shows a relation between the coefficient of friction measured when sliding was repeated 2,000 times and the roughness of the slide surface of the cylindrical shaft 21. The roughness of the slide surface of the cylindrical shaft 21 was expressed in the arithmetic average roughness (Ra). As known from FIG. 11, in order to secure the coefficient of friction of 0.1 or below, the roughness of the slide surface of the cylindrical shaft 21 was required to be 0.2 μm or more in terms of the arithmetic average roughness (Ra).

In the present embodiment, a collection of fine recesses 31 were formed on the surface of the cylindrical shaft 21 by shot blasting. The processing method is not limited to shot blasting as far as the arithmetic average roughness (Ra) of a collection of recesses 31 formed on the slide surface is 0.2 μm or more. A similar collection of fine recesses 31 can be formed even by laser processing or etching, for example.

Even in the case of forming the grooves on the bearing slide section of the shaft, the coefficient of friction of 0.1 or below can be secured as far as the roughness of the slide surface of the shaft is 0.2 μm or more in terms of the arithmetic average roughness (Ra)

Here, the gas supplied from the gas supply section 7 will be described. In a state the external wet air was supplied to the interior of the protection cover 5 from the gas supply section 7 and was introduced to the bearing slide section to perform sliding, the coefficient of friction was approximately 0.25 even when the grooves 10 were formed. On the other hand, when a dry gas such as dry nitrogen and dry argon is similarly supplied at the flow rate of 20 L/min, the coefficient of friction reduced from approximately 0.25 in the early stage to 0.1 or below as sliding was repeated. Even when a dry air including oxygen was used as a dry gas, the coefficient of friction reduced from approximately 0.25 in the early stage to 0.15, securing certain effect. With respect to the dry gas, the effect of reduction in the coefficient of friction is higher when a deoxidizing gas is used. Examples of the deoxidizing gas include an inert gas such as nitrogen and argon, hydrogen gas, and hydrocarbon gas. In a state the gas obtained by evaporating liquefied nitrogen was supplied instead of the dry air and the supply rate was controlled so that the temperature inside the protection cover 5 was −100° C., the coefficient of friction was 0.05, which was lower than the coefficient of friction in the case dry nitrogen of the ordinary temperature was supplied.

The cylindrical shafts 21a, 21c, 21d, and 21e described in the present embodiment may be used for the journal type slide bearing device described in the first embodiment.

Third Embodiment

Figure 12:
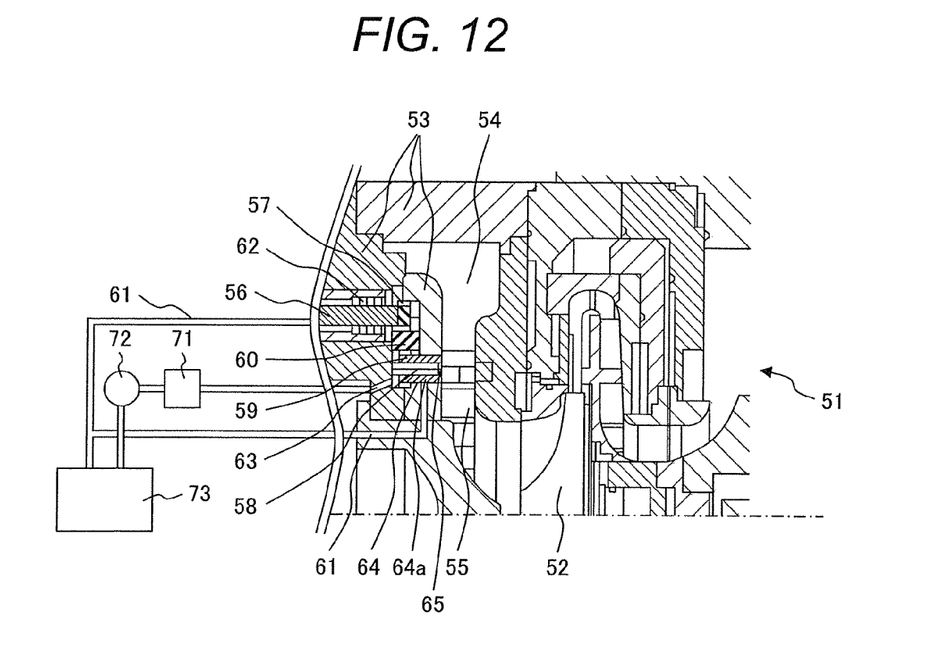
FIG. 12 shows a bearing section of a centrifugal compressor according to a third embodiment of the present invention.
Figure 13:
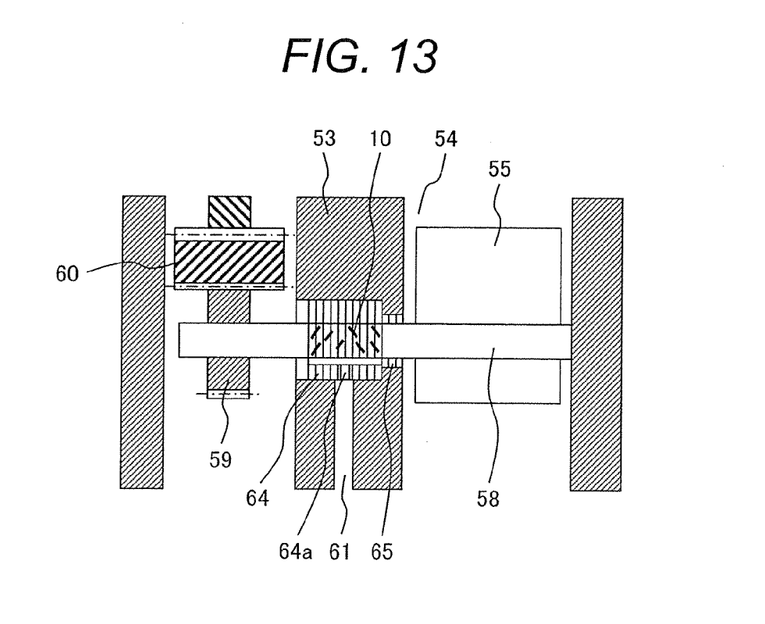
FIG. 13 is an enlarged view of a bearing portion of the centrifugal compressor according to the third embodiment of the present invention.

With reference to FIG. 12 and FIG. 13, a compressor in accordance with an embodiment of the present invention will be described. In the present embodiment, the slide bearing device according to the present invention is applied to a centrifugal compressor. FIG. 12 shows a bearing section of the centrifugal compressor, and FIG. 13 is an enlarged view of the bearing portion of the centrifugal compressor.

The centrifugal compressor 51 of the present embodiment is configured to rotate an impeller 52 attached to a main shaft (not shown in FIG. 12 and FIG. 13) by a driving device (not shown in FIG. 12 and FIG. 13) and to compress gas by rotation of the impeller 52, the gas passing through a flow passage 54 provided in a casing 53 and being supplied to the impeller 52. The compressed gas passes through a discharge hole (not shown in FIG. 12 and FIG. 13) and is supplied to the outside. The main shaft rotating the impeller 52, which is not shown in FIG. 12, is attached to the lower side of the impeller 52.

The centrifugal compressor 51 includes a plurality of vanes 55 for controlling the flow rate of the gas in the flow passage 54 introducing the gas to the impeller 52.

The vanes 55 are swung by a gear mechanism including a first gear 57, a second gear 60 and a third gear 59. The first gear 57 is a driving gear fixed to a driving shaft 56 connected to a drive mechanism (not shown). The third gear 59 is a vane gear fixed to a vane shaft 58 connected to the vanes 55. The second gear 60, interposed between the first gear 57 and the third gear 59, is a ring gear transmitting rotation from the first gear 57 (driving gear) to third gear 59.

The first gear 57, the second gear 60 and the third gear 59 are stored inside the casing 53. The first gear 57 and the third gear 59 are provided on the driving shaft 56 and the vane shaft 58 respectively, and are rotatably supported by a bearing 62 and a bearing 64 fixed inside the casing 53. The bearing 62 and the bearing 64 are formed of polyphenylenesulfide (PPS) resin including carbon fibers.

As shown in an enlarged view of the bearing portion of FIG. 13, grooves 10 extending in a direction different from the rotational direction of the vane shaft 58 are formed on the surface of the vane shaft 58 in a range where the vane shaft 58 slides against the bearing 64. In a similar manner, grooves 10 extending in a direction different from the rotational direction of the driving shaft 56 are formed (not shown) on the surface of the driving shaft 56 in a range where the driving shaft 56 slides against the bearing 62.

The vane shaft 58 includes a seal 65 on the flow passage 54 side to prevent gas flow from the inside of the flow passage 54. Although a contact type seal was used for the seal 65 in the present embodiment, a non-contact type labyrinth seal is also applicable.

Gas supply section 61 is connected to the bearings 62 and 64, and a gas supply device 73 including a gas cylinder is connected to the gas supply section 61. The gas supply device 73 supplies nitrogen with the dew point temperature of −50° C. or below at the pressure of approximately 0.02 MPa. The supplied nitrogen is recovered from a communication hole 63 for communicating with the outside, configured by a check valve (not shown) provided in a part of the casing 53 in which the gear mechanism is included. The recovered nitrogen is dehumidified in the gas supply device 73.

High pressure air from which moisture and dust has been removed and an inert gas such as argon may be supplied instead of nitrogen, and a gas producing device may be used instead of the gas cylinder. The recovered nitrogen is returned to the gas supply device 73 through a dust removing device 71 and a pump 72, and is circulated and supplied to the bearing 64.

For the bearing 64, as shown in the enlarged view of the bearing portion of FIG. 13, nitrogen is supplied to the bearing slide section through the bearing surface sliding against the vane shaft 58 and through a communication hole 64a communicating with the gas supply section 61. For the bearing 62, nitrogen is supplied to the bearing slide section from the end part of the bearing 62 along the driving shaft 56 through a gap against the driving shaft 56.

In a state the circulating nitrogen was thus supplied to the bearings, the centrifugal compressor conducted a predetermined motion. The temperature of the gas flowing through the flow passage 54 can be set widely from −160° C. to 60° C. according to a kind of the gas. In the centrifugal compressor according to the present embodiment, the torque of the driving shaft 56 was reduced under a variety of temperature conditions without using grease and a solid lubricant, compared with the case the dry gas was not flowed.

Figure 14:
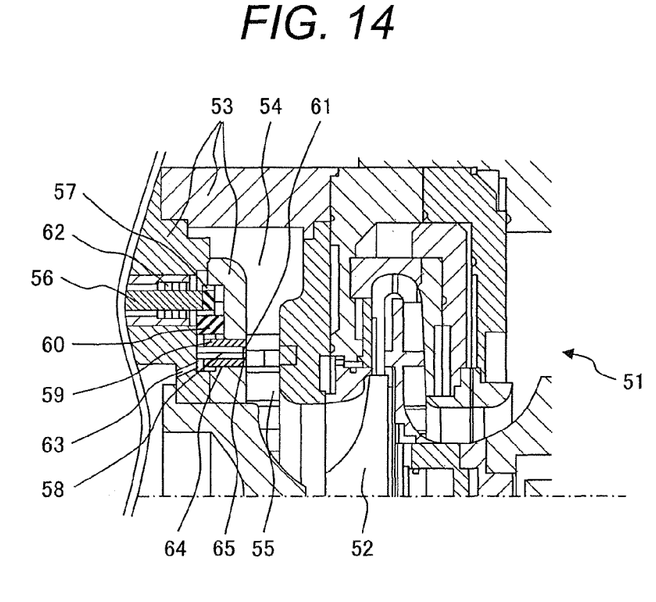
FIG. 14 shows a bearing section of the centrifugal compressor according to the third embodiment of the present invention, wherein a gas supply section is formed by providing a gap between a seal and a shaft, and a part of gas compressed by the compressor is supplied to a bearing slide section.
Figure 15:
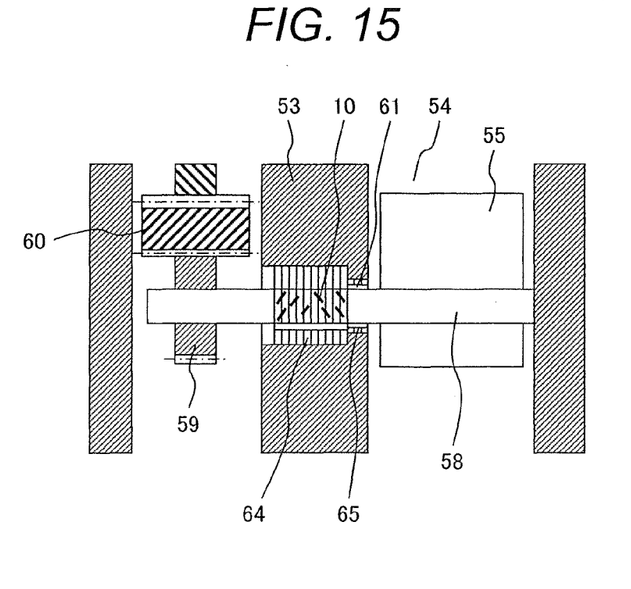
FIG. 15 is an enlarged view of a bearing portion of the centrifugal compressor according to the third embodiment of the present invention, wherein the gas supply section is formed by providing the gap between the seal and the shaft.

With respect to a method for supplying the dry gas to the bearing slide section, when the gas to be compressed by the compressor is dehumidified air, an inert gas such as nitrogen and argon, or a dry gas represented by hydrogen gas and hydrocarbon gas like, even using the flow passage of the gas to be compressed as a supply source secures the similar effect of reduction in the torque, in addition to the case the gas supply device 73 shown in FIG. 12 is used as a supply source. When the gas to be compressed by the compressor is utilized, a passage which communicates from the flow passage 54 to the bearing slide section may be provided to supply the gas. Or otherwise, as shown in FIG. 14, such a configuration may be possible that a gap is arranged between the vane shaft 58 and the seal 65 to form the gas supply section 61 communicating from the flow passage 54 to the peripheries of respective bearings, the gas being supplied from the gas supply section 61 to respective bearing slide sections through the gap between the vane shaft 58 and the bearing 64 and through the gap between the driving shaft 56 and the bearing 62. FIG. 15 shows an enlarged view of the bearing portion configured by the structure shown in FIG. 14.

As a comparative example in relation to the material of the bearing, a bearing formed of polyetheretherketone (PEEK) resin not mixed with carbon material was used, and a measurement similar to that described in the second embodiment was executed. As a result, the coefficient of friction kept 0.3 or above from the early stage of sliding and did not reduce to 0.1 or below even when sliding was repeated 2,000 times, reduction similar to the embodiments of the present invention not being secured.

The grooves formed on the surfaces of the vane shaft 58 and the driving shaft 56 may also be the grooves extending in the direction perpendicular to the sliding direction as described in the first and second embodiments (FIG. 4), the grooves extending in a direction different from the rotational direction and the axial direction (FIG. 7), or the grooves directed in arbitrary directions (FIG. 8). Furthermore, a number of fine recesses (FIG. 9) may be formed on the surfaces of the vane shaft 58 and the driving shaft 56, instead of the grooves.

With respect to the resin composite material used for the bearings, polyetheretherketone (PEEK) and polyphenylenesulfide (PPS) were shown in the above embodiments as a kind of a resin mixed with the carbon material. Moreover, it is also possible to use polyamide, polyphtalamide, polyamideimide, polyacetal, polyetherimide, ultra-high molecular weight polyethylene, for example.

Also, with respect to the resin composite material used for the bearings, carbon fibers were shown in the above embodiments as a carbon material mixed with a resin. Moreover, carbon materials in a variety of forms may also be used instead, such as spherical, flaky, particulate, or granular forms. In particular, by adding a carbon material including graphite, friction tends to reduce more quickly and stably.

As the resin composite material, the carbon material of a single form may be added to a resin. Moreover, carbon materials of plural forms may also be mixed according to intended usage. Mixing carbon materials of plural forms leads to obtain a property hardly obtained with carbon material of a single form. For example, when a resin composite material obtained by mixing a resin and a combination of carbon fibers and a graphite particulate carbon material is used, an advantageous effect is secured that quicker and greater reduction in friction is obtained while maintaining the strength against application of a load.

It is not necessary to uniformly mix the carbon material over the entire resin composite material. For example, in a bearing formed of a resin composite material mixed with carbon fibers, a structure with a gradient composition can be applied in which the graphite carbon material exists in larger amount in the vicinity of the slide surface, obtained by applying coating and a projection treatment. This structure has an advantage of effectively reducing the coefficient of friction in the early stage in particular.

As described above, according to the present invention, a slide bearing device and a compressor including a slide section with low friction can be obtained, without using oil, grease, or a solid lubricant, by using the bearing formed of a resin composite material obtained by mixing the carbon materials in a form or plural forms (fibriforms, spherical, flaky, particulate, or granular, for example) and a resin and by controlling the atmosphere of the slide section.

EXPLANATION OF REFERENCE NUMERALS

1 . . . Bearing
2 . . . Resin slide section
3 . . . Casing
4a . . . Shaft including grooves extending in the direction perpendicular to the slide direction
4b . . . Shaft without a groove
5 . . . Protection cover
6 . . . Venting hole
7 . . . Gas supply section
8 . . . Flow of gas
9 . . . Processing traces
10 . . . Grooves
21 . . . Cylindrical shaft
21a . . . Cylindrical shaft including grooves extending in the direction perpendicular to the slide direction
21b . . . Cylindrical shaft without a groove
21c . . . Cylindrical shaft including grooves extending in a direction different from the rotational direction and the axial direction
21d . . . Cylindrical shaft including grooves directed in arbitrary directions
21e . . . Cylindrical shaft including a number of fine recesses scattered on the surface
22 . . . Flat plane type bearing
23 . . . Cantilever
24 . . . Weight
51 . . . Centrifugal compressor
52 . . . Impeller
53 . . . Casing
54 . . . Flow passage
55 . . . Vane
56 . . . driving shaft
57 . . . First gear
58 . . . Vane shaft
59 . . . Third gear
60 . . . Second gear
61 . . . Gas supply section
62, 64 . . . Bearings
71 . . . Dust removing device
72 . . . Pump
73 . . . Gas supply device What is clamied is:

1. A slide bearing device comprising:
a bearing;
a shaft supported by the bearing and in contact with the bearing during motion of the shaft while the shaft is subjected to sliding;
a gas supply section for supplying a dry gas to a bearing slide section where the bearing and the shaft slide against and are in contact with each other; and
a cover for covering the bearing,
wherein the gas supply section is attached to the cover and supplies the dry gas to the bearing slide section covered with the cover,
wherein the bearing includes at least a slide surface formed of a resin composite material, the resin composite material being a mixture of a carbon material and a resin, and
wherein the shaft is made of a metal and includes a groove formed on a slide surface of the shaft, the groove extending in a direction different than a sliding direction.

2. The slide bearing device according to claim 1,
wherein the slide surface of the shaft has a roughness of 0.2 μm or more in arithmetic average roughness.

3. A slide bearing device comprising:
a bearing;
a shaft supported by the bearing and in contact with the bearing during motion of the shaft while the shaft is subjected to sliding;
a gas supply section for supplying a dry gas to a bearing slide section where the bearing and the shaft slide against and are in contact with each other; and
a cover for the bearing;
wherein the gas supply section is attached to the cover and supplies the dry gas to the bearing slide section covered with the cover,
wherein the bearing includes at least a slide surface formed of a resin composite material, the resin composite material being a mixture of a carbon material and a resin, and
wherein the shaft is made of a metal and includes a collection of a plurality non-continuous of grooves formed on a slide surface of the shaft, the plurality of grooves extending in a direction different than a sliding direction.

4. The slide bearing device according to claim 3,
wherein the plurality of non-continuous grooves extend in arbitrary directions.

5. The slide bearing device according to claim 4,
wherein the slide surface of the shaft has a roughness of 0.2 μm or more in arithmetic average roughness.

6. The slide bearing device according to claim 3,
wherein the slide surface of the shaft has a roughness of 0.2 μm or more in arithmetic average roughness.

7. A slide bearing device comprising:
a bearing;
a shaft supported by the bearing and in contact with the bearing during motion of the shaft while the shaft is subjected to sliding;
a gas supply section for supplying a dry gas to a bearing slide section where the bearing and the shaft slide against and are in contact with each other; and
a cover for covering the bearing;

wherein the gas supply section is attached to the cover and supplies the dry gas to the bearing slide section covered with the cover, wherein the bearing includes at least a slide surface formed of a resin composite material, the resin composite material being a mixture of a carbon material and a resin, and wherein the shaft is made of a metal and includes a collection of a plurality of recesses formed on a slide surface of the shaft.

8. The slide bearing device according to claim 7, wherein the slide surface of the shaft has a roughness of 0.2 μm or more in arithmetic average roughness.

9. A compressor comprising:

a slide bearing;

a driving shaft being supported by the slide bearing and rotating in contact with the slide bearing during rotation of the shaft;

a case for storing the slide bearing;

a compressing section being connected to the driving shaft and compressing fluid; and a gas supply section for supplying a dry gas to a bearing slide section where the slide bearing and the driving shaft slide against and are in contact with each other, wherein the gas supply section is attached to the casing and supplies the dry gas to the bearing slide section in the casing, wherein the slide bearing is formed of a resin composite material, the resin composite material being a mixture of a carbon material and a resin and wherein the driving shaft includes a groove formed on a slide surface of the driving shaft, the groove extending in a direction different than a sliding direction.

10. The compressor according to claim 9, wherein the slide surface of the driving shaft has a roughness of 0.2 μm or more in arithmetic average roughness.

11. A compressor comprising:

a slide bearing;

a driving shaft being supported by the slide bearing and rotating in contact with the slide bearing during rotation of the shaft;

a casing for storing the slide bearing;

a compressing section being connected to the driving shaft and compressing fluid; and a gas supply section for supplying a dry gas to a bearing slide section where the slide bearing and the driving shaft slide against and are in contact with each other, wherein the gas supply section is attached to the casing and supplies the dry gas to the bearing slide section in the casing, wherein the slide bearing is formed of a resin composite material, the resin composite material being a mixture of a carbon material and a resin, and wherein the driving shaft includes a collection of a plurality of non-continuous grooves formed on a slide surface of the driving shaft, the plurality of grooves extending in a direction different than a sliding direction.

12. The compressor according to claim 11, wherein the plurality of grooves extend in arbitrary directions.

13. The compressor according to claim 12, wherein the side surface of the driving shaft has a roughness of 0.2 μm or more in arithmetic average roughness.

14. The compressor according to claim 11, wherein the slide surface of the driving shaft has a roughness of 0.2 μm or more in arithmetic average roughness.

15. A compressor comprising:

a slide bearing;

a driving shaft being supported by the slide bearing and rotating in contact with the slide bearing during rotation of the shaft;

a casing for storing the slide bearing;

a compressing section being connected to the driving shaft and compressing fluid; and a gas supply section for supplying a dry gas to a bearing slide section where the slide bearing and the driving shaft slide against and are in contact with each other, wherein the gas supply section is attached to the casing and supplies the dry gas to the bearing slide section in the casing, wherein the slide bearing is formed of a resin composite material, the resin composite material being a mixture of a carbon material and a resin, and wherein the driving shaft includes a collection of a plurality of recesses formed on a slide surface of the driving shaft.

16. The compressor according to claim 15, wherein the slide surface of the driving shaft has a roughness of 0.2 μm or more in arithmetic average roughness.

* * * * *